Patented Jan. 16, 1951

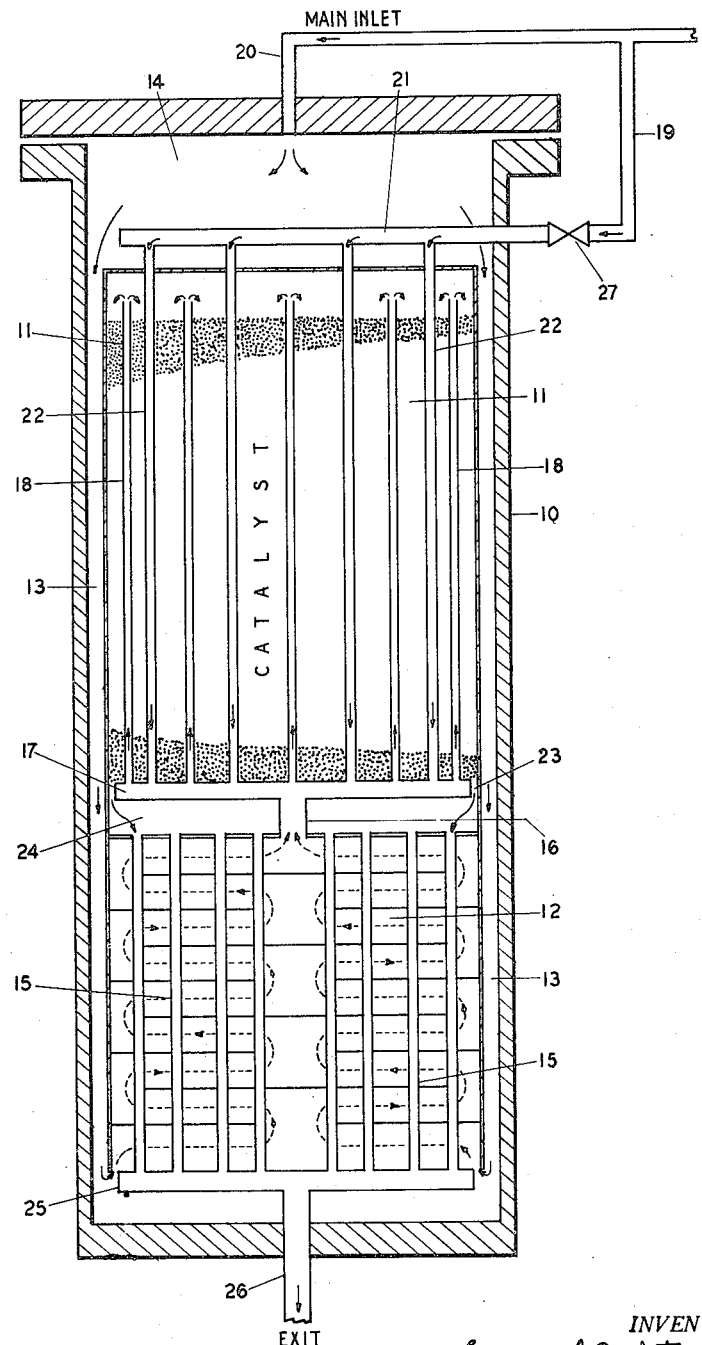

2,538,738

UNITED STATES PATENT OFFICE 2,538,738

PROCESS AND APPARATUS FOR CARRYING OUT EXOTHERMIC REACTIONS

Leonard A. Stengel, Terre Haute, Ind., assignor to Commercial Solvents Corporation, Terre Haute, Ind., a corporation of Maryland Application September 4, 1945, Serial No. 614,211

3 Claims. (Cl. 23—288)

This invention relates to a method and apparatus for carrying out exothermic gaseous or vapor phase chemical reactions, and more particularly to a method and apparatus for effecting temperature control within the relatively narrow limits within the optimum reaction temperature range required for satisfactory yields of product.

In the manufacture of valuable products such as methanol, ammonia, and the like, by direct synthesis from their component gases, the reacting gases are passed at high temperatures and under pressure over a catalyst mass, whereupon the gases combine exothermically, usually liberating a greater quantity of heat than necessary to maintain the optimum temperature required for the reaction to proceed.

In the manufacture of methanol the optimum temperature of the carbon monoxide and hydrogen reaction mixtures for satisfactory operation is between about 300° to 400° C. The synthetic ammonia reaction between nitrogen and hydrogen is usually carried out at temperatures between 400° and 600° C., and for maximum yields, and for most efficient utilization of the catalyst material, considerably closer temperature controls are desirable often within a 50° range within the temperature range mentioned, for example between 450° and 500° C.

Temperature control has been effected in industrial installations used in the past, by a number of expedients, one of which involves leading partially preheated reaction gases through the catalyst bed but out of contact therewith and thereafter passing these gases in reacting contact with the catalyst. In this procedure the gases are raised to reaction temperature as they proceed through the catalyst bed, withdrawing heat from the gases reacting in the catalyst chamber. However, near the top of the catalyst bed, very little cooling is effected by the hot gases, since they are by this time close to the reaction temperature, and local overheating of the catalyst tends to occur.

Quenching with cold gases passed directly into the catalyst bed or admixed with the gases to react, before bringing them into contact with the catalyst proved unsatisfactory, as this prior art procedure resulted in a poor temperature gradient by bringing the temperature of the top section of the catalyst below the temperature of optimum reaction efficiency and preventing a maximum conversion by the catalyst. Moreover, quenching with cold gases added directly into the catalyst bed was also unsatisfactory because it caused channelling which was difficult to stop due to the enhanced differences in densities between hot and cold gases at high pressures.

I have now found that very efficient cooling can be effected, and a uniform temperature can be maintained throughout the entire catalyst bed according to my invention in which two series of tubes are provided within the catalyst bed with openings in opposite ends of the catalyst beds and adapted for passing reaction gases in opposite directions therethrough out of contact with the catalyst.

In the drawing, the figure illustrates schematically a vertical section of a converter such as an ammonia or methanol converter, adapted for carrying out my invention.

The converter comprises an outer shell 10, provided with a main gas inlet 20, said shell enclosing a catalyst bed 11, and preheater chamber 12, both spaced from said outer shell by an annular passageway 13, extending from a gas receiving chamber 14 at the top of the converter to the lower portion of said preheater chamber. Preheater chamber 12 is equipped with heat exchanger tubes 15. A connecting pipe 16 leads from the preheater tubes 15 into a manifold 17 and thence into tubes 18 extending throughout the catalyst chamber and opening at their extremities into the top of the catalyst chamber. A supplemental inlet 19 is connected through a manifold 21 to a series of tubes 22 likewise extending throughout the catalyst bed and opening at the opposite end into manifold 17.

Manifold 17 is spaced apart from the inside walls of the catalyst bed, forming an annular space 23, opening into chamber 24, which in turn opens into heat exchanger tubes 15, and thence into manifold 25 and finally into exit passage 26.

In operation, the cold gases to react, entering through main inlet 20 under positive pressure, pass into chamber 14 at the top of the converter and thence pass through annular space 13 between converter shell 10 and catalyst chamber 11 to the bottom of preheater unit 12. The cold gases pass around interchanger tubes 15 which contain hot reaction gases. The entering gases to react are heated and the exit gases simultaneously cooled. The preheated gases then pass upwardly through connecting pipe 16 into manifold 17, and thence into heat exchanger tubes 18 disposed throughout the catalyst. Thus the partially preheated entering gases to react are brought into heat exchanging relation with the catalyst, but are out of direct contact with the catalyst. The gases pass upwardly through the catalyst bed and are discharged at the top of the enclosed catalyst chamber and thence flow downwardly through the catalyst and there react exothermically, part of the heat of reaction being absorbed by the incoming gases in tubes 18.

During the progression of the gases to react, as they pass through the preheater and catalyst cooling tubes, the temperature of the gases is progressively raised so that as they emerge from the tubes and enter the catalyst chamber at the top, they are at about the lower limit of the reaction temperature range. Upon contact with the catalyst, reaction takes place immediately and with considerable evolution of heat. At this point in the catalyst bed very little cooling effect is obtained from the interchanger tubes carrying the gases to react, as these gases are already at or close to reaction temperature.

At this point according to my invention supplementary additional cold or partially heated gases to react are introduced through manifold 19 into a second series of interchanger tubes 22 disposed throughout the catalyst in regularly spaced interrelation to the first series of tubes and the supplementary gases are led downwardly, through these tubes countercurrent to the flow of preheated gases through the first series of tubes, and likewise out of contact with the catalyst. These tubes 22 open into manifold 17, where the downwardly flowing supplementary gases join the gases from the preheater and thence flow upwardly through the first series of interchanger tubes 18, and are released at the top of the catalyst chamber to flow downwardly through and in contact with the catalyst, to there react.

The introduction of cold or partially heated gases in tubes at the top of the catalyst bed serves to bring about needed cooling where the catalyst bed is hottest, near the top, since, as brought out above, very little cooling is effected by the upwardly flowing gases which are at that point at or near reaction temperature.

The gases to react, passing downwardly through the catalyst bed 11, react exothermically to raise the temperature of the catalyst and of the gases themselves. To prevent too great a temperature rise such as to exceed the temperature most favorable for efficient reaction, and which would otherwise damage the catalyst, as well as lower the efficiency of conversion, heat is removed by the incoming gases in tubes 18 in heat exchanging relation to the catalyst, but out of contact therewith. Additional temperature regulation is afforded by quenching gases passing countercurrent through tubes 22, these gases also being in heat exchanging relation to, but out of contact with the catalyst.

Extremely flexible temperature regulation is afforded by the gases in the second series of tubes 22, permitting immediate variation with varying operating conditions as these gases may be introduced at any desired temperature, and a change may be made at any desired moment by manual or automatic regulation of valve 27. Thus a desired temperature control can be effected immediately whereas with only the single series of tubes containing the upwardly flowing preheated gases, there is a serious time lag involved in changing preheater temperature and so on.

The uniform distribution of cooling gases throughout the catalyst mass by the plurality of tubes disposed at regular intervals therethrough permits uniform cooling of the catalyst, and prevents harmful channelling of the gases and prevents harmful local undercooling which often results from the introduction of cold "quenching" gases directly into the catalyst chamber.

After the gases to react have passed through the catalyst bed, and the reaction product has formed, the reaction gases pass downwardly out of the catalyst bed through annular space 23 into chamber 24, thence downwardly through preheater tubes 15 where they serve to preheat the cold entering gases to react. Thence the reaction gases pass into another manifold 25 thence are led through exit pipe 26 to a conventional recovery apparatus (not shown).

Temperature control can be effected according to my invention by varying the relative quantity and rate of feed of gases to react, passed to the two inlets. If local overheating starts to occur, more cold gases can be introduced at the top of the bed, with a corresponding diminution of the feed to the main inlet. If too much cooling is being effected, the flow to the quench tubes may be reduced or bypassed entirely.

It is to be understood that although the above describes the preferred embodiments of my invention, the method and apparatus may be varied in many ways without departing from the nature of my invention and within the scope of the appended claims.

What is claimed is:

1. In conducting catalytic exothermic gaseous reactions, the process which comprises dividing a stream of gases to be reacted into two streams, preheating one of said streams by passing it in indirect heat conducting relationship with a stream of hot reacted gases, dividing the second stream into a plurality of small streams and passing the latter at spaced points through a bed of catalyst in indirect heat conducting relationship with said catalyst and in the same direction as the gases which pass in direct contact with the catalyst, thereby cooling said bed of catalyst, collecting the said plurality of streams of gas at the opposite end of said catalyst bed and mixing them with the first preheated gas stream, passing the mixture in a plurality of small streams at points spaced from said first mentioned small streams of cooling gas in indirect heat conducting relationship through the bed of catalyst and in a counter-current direction to said first mentioned small streams of cooling gas, collecting the small streams of mixed gas and again passing the mixture through the bed of catalyst in direct contact with the catalyst, collecting the so-reacted gas and passing it in indirect heat conducting relationship with said first stream of gases to preheat the same, and regulating the relative volumes of said first and second streams of gas in order to control the temperature of the bed of catalyst.

2. An apparatus for effecting catalytic exothermic gaseous reactions, which comprises an outer shell, a heat exchanger mounted in the bottom of said shell, a catalyst receptacle mounted above said heat exchanger spaced from the wall of said shell to leave an annular space therebetween, said annular space communicating with said heat exchanger, means for feeding a stream of reactant gases into said annular space, a gas header communicating with and above said heat exchanger for receiving the preheated gases, said gas header being spaced apart from the inside walls of said catalyst receptacle to leave annular spaces therebetween, said annular spaces communicating above with the catalyst receptacle and below with sets of vertical tubes passing through said heat exchanger and out of said shell, a second gas header above said catalyst receptacle, a set of spaced vertical tubes connecting said headers and passing through said catalyst receptacle, means for feeding a second stream of reactant gases to the upper header, a second set of spaced vertical tubes spaced from said first set and passing through the catalyst receptacle connecting the lower header with a space provided at the top of the catalyst receptacle.

3. An apparatus for effecting catalytic exothermic gaseous reactions, which comprises an outer shell, a catalyst receptacle mounted in said shell, a gas header for cooling gases above said receptacle, a second gas header below said receptacle and spaced apart from the inside walls of said catalyst receptacle to leave annular spaces therebetween, a set of spaced apart vertical tubes connecting said headers, a second set of vertical tubes leading from said second gas header upwardly through the catalyst receptacle to points near the top of said catalyst receptacle, said second set of tubes being spaced from said first set of tubes, means for preheating a stream of gases to be reacted and for passing said stream into said second gas header beneath the catalyst, means for passing a second stream of gases to be reacted into the upper header and means for regulating the relative volumes of said streams of gases to be reacted thereby to control the temperature of the body of catalyst.

LEONARD A. STENGEL.

REFERENCES CITED

The following references are of record in the file of this patent:

UNITED STATES PATENTS

| Number | Name | Date |
| --- | --- | --- |
| 1,707,417 | Richardson | Apr. 2, 1929 |
| 1,932,247 | Kniskern | Oct. 24, 1933 |
| 2,051,744 | Kleinschmidt | Aug. 18, 1936 |